United States Patent [19]

Müller et al.

[11] Patent Number: 5,346,387

[45] Date of Patent: Sep. 13, 1994

[54] MOLD FOR MANUFACTURING POLYURETHANE PARTS FOR USING THE RIM PROCESS

[75] Inventors: Heinz Müller; Klaus Schulte, both of Leverkusen, Fed. Rep. of Germany

[73] Assignee: Bayer Aktiengesellschaft, Leverkusen, Fed. Rep. of Germany

[21] Appl. No.: 884,105

[22] Filed: May 15, 1992

[30] Foreign Application Priority Data

May 24, 1991 [DE] Fed. Rep. of Germany ....... 4116951

[51] Int. Cl.$^5$ ............................................. B29C 45/02
[52] U.S. Cl. ................................. 425/543; 264/328.6; 264/328.9; 264/328.12; 425/555; 425/577; 425/554
[58] Field of Search ...................... 264/161, 163, 328.1, 264/328.5, 328.6, 328.9, 328.12; 425/542, 543, 553, 577, 555, 554

[56] References Cited

U.S. PATENT DOCUMENTS

| | | | |
|---|---|---|---|
| 3,331,904 | 7/1967 | Friedman | 264/328.9 |
| 3,443,001 | 5/1969 | Adair et al. | 264/328.9 |
| 3,898,314 | 8/1975 | Church | 264/328.5 |
| 4,247,515 | 1/1981 | Olabisi | 264/328.12 |
| 4,334,849 | 6/1982 | Bock | 264/163 |
| 4,379,686 | 4/1983 | Chambers et al. | 264/163 |
| 4,714,579 | 12/1987 | Boden et al. | 264/328.6 |
| 4,767,312 | 8/1988 | Hütter | 425/577 |
| 4,880,587 | 11/1989 | Eichlseder et al. | 264/328.9 |
| 5,093,067 | 3/1992 | Gibson | 264/328.1 |

OTHER PUBLICATIONS

*Mold Making Handbook for Plastics Engineer*, ed. Stoeckhert, Klaus Hanser Publications NY:1983 pp. 96–97.

Primary Examiner—Jay H. Woo
Assistant Examiner—Duane S. Smith
Attorney, Agent, or Firm—Joseph C. Gil

[57] ABSTRACT

A mold for manufacturing polyurethane parts using the RIM process, has two mold halves which between them enclose a mold cavity. The mold cavity is sealed off from the outside by a sealing surface. A gap of 15 to 30 mm depth and 0.15 to 0.25 mm width is provided between the mold cavity and the sealing surface.

2 Claims, 1 Drawing Sheet

MOLD FOR MANUFACTURING POLYURETHANE PARTS FOR USING THE RIM PROCESS

BACKGROUND OF THE INVENTION

The present invention relates to a mold for manufacturing polyurethane parts using the reaction injection molding process. The mold comprises two mold halves which between them enclose a mold cavity which is sealed off from the outside by a sealing surface.

When manufacturing polyurethane parts using the RIM process, spew in the parting planes of the mold halves causes considerable problems. The liquid reaction mixture, as it is poured into the mold and especially as it reacts and due to the rise in pressure, penetrates into minute gaps in the parting planes. Although advanced machine tool technology has made it possible to achieve degrees of dimensional accuracy for the contoured parting plane shapes in steel tools of a maximum gap accuracy of around 50 $\mu$, the reaction mixture is still able to penetrate these small gaps. The result is an extremely thin spew which is known in the industry as "flit". It is very brittle, generally breaks off from the molded part and is left as splinters in the mold.

Removal of the splinters from the mold is very laborious and is usually carried out with compressed air, causing environmental pollution. If splinters are left in the mold cavity, defects occur in the next molded part. The whole cycle is substantially prolonged by the necessity of carrying out cleaning.

The object of the present invention was the development of a mold for manufacturing polyurethane parts using the RIM process, whereby flit formation and the source of errors associated therewith could be avoided.

DESCRIPTION OF THE INVENTION

Figure 1:
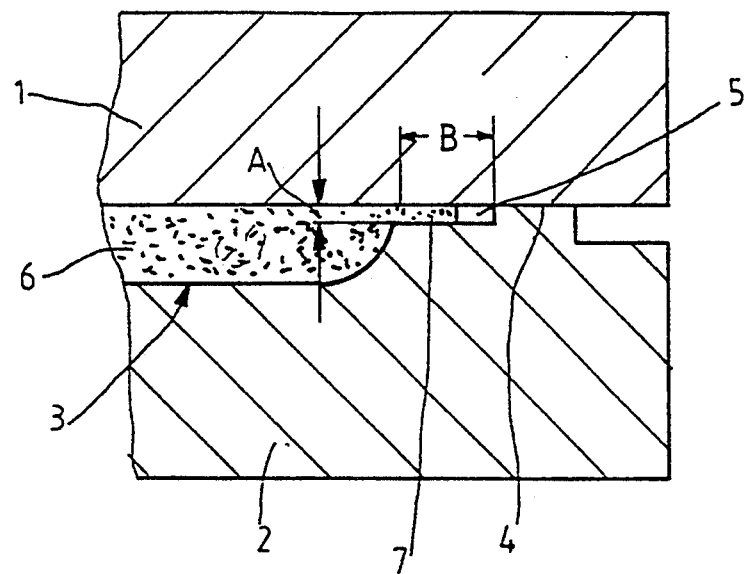
FIG. 1 represents a first embodiment of the present invention.

The above noted object is achieved by providing a gap 15 to 30 mm deep and 0.15 to 0.25 mm wide between the mold cavity and the sealing surface. Surprisingly it has been found that, despite high internal pressures of up to 40 bar, the reaction mixture does not fully penetrate into such a gap, i.e. the depth of the gap is not completely filled. The gap need not necessarily be provided over the entire length of the sealing surface. The requisite gap size is however dependent upon the size of the mold cavity, the pressure arising in the mold cavity and the viscosity of the reaction mixture. The greater the mold cavity size and the internal pressure, the greater the size of the gap should be. An increase in the viscosity of the reaction mixture, on the other hand, reduces the required gap size. Since the gap width and depth are predetermined to a certain extent, the main way of creating the required gap size is the gap length. In the majority of cases, a gap depth of 20 mm has proved advantageous because the spew, as desired, does not completely fill said depth.

According to one special embodiment, a slide is disposed in the upper mold half and, with the adjacent wall, forms the sealing surface and the gap. This construction is advantageous when the mold is required to have slides.

Outlines of two embodiments of the new mold are illustrated purely diagrammatically and in cross-section in the drawings and are described in greater detail hereinafter.

In FIG. 1, the mold comprises an upper mold half 1 and a lower mold half 2, which between them enclose a mold cavity 3 and seal against one another by means of a sealing surface 4. Disposed in the mold half 2 between the mold cavity 3 and the sealing surface 4 is a peripheral gap 5 having a width A of 0.2 mm and a depth B of 20 mm. The molded part or the content of the mold cavity is designated 6 and the spew extending into the gap is designated 7.

Figure 2:
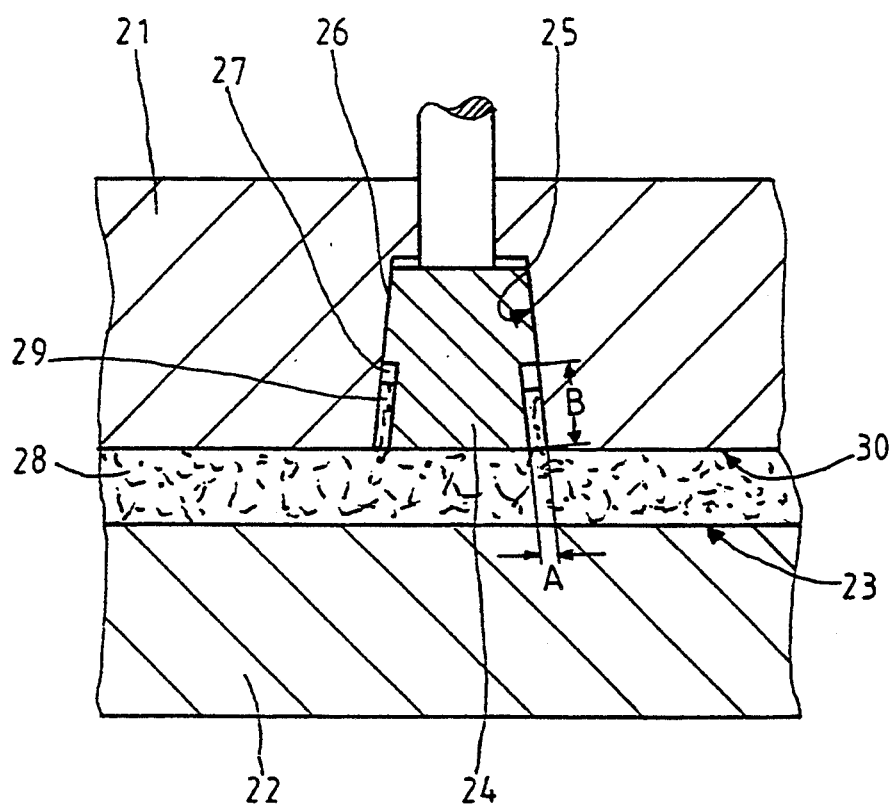
FIG. 2 represents a second embodiment.

In FIG. 2, the mold comprises an upper mold half 21 and a lower mold half 22, which between them enclose a mold cavity 23. A slide 24 disposed in the upper mold half 21 and, with the surrounding wall 25, forms a sealing surface 26 and a gap 27 having the width A=0.18 mm and the depth B=22 mm. The molded part or the content of the mold cavity is designated 28 and the spew protruding into, but not quite filling the gap 27 is designated 29. The slide 24 terminates flush with the mold cavity wall 28 and serves as an ejector. Upon withdrawal, the spew 29 adheres to the molded part 30 and may be completely removed along with said part from the mold. Because of the adequate gap width A, no residues are left in the mold.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mold for manufacturing polyurethane parts using the reaction injection molding process, comprising two mold halves which between them enclose a mold cavity, said mold cavity being sealed by a sealing surface, and wherein a gap of 15 to 30 mm depth and 0.15 to 0.25 mm width is provided between the mold cavity and the sealing surface.

2. A mold for manufacturing polyurethane parts using the reaction injection molding process, comprising an upper mold half and a lower mold half which between them enclose a mold cavity, said upper mold half being provided with a bore in which a moveable ejector slide is disposed, with a portion of said slide and the walls surrounding said bore forming a sealing surface, and the remaining portion of said slide and said walls defining a gap of 15 to 30 mm depth and 0.15 to 0.25 mm width.

* * * * *